United States Patent
Ma et al.

(10) Patent No.: US 7,116,716 B2
(45) Date of Patent: Oct. 3, 2006

(54) SYSTEMS AND METHODS FOR GENERATING A MOTION ATTENTION MODEL

(75) Inventors: Yu-Fei Ma, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 686 days.

(21) Appl. No.: 10/285,933

(22) Filed: Nov. 1, 2002

(65) Prior Publication Data

US 2004/0086046 A1    May 6, 2004

(51) Int. Cl.
*H04N 7/12* (2006.01)
*G06K 9/36* (2006.01)

(52) U.S. Cl. .................. 375/240.16; 382/236

(58) Field of Classification Search ........... 375/240.16, 375/240.29; 345/474, 629; 382/170, 236, 382/107; 340/982

See application file for complete search history.

(56) References Cited

U.S. PATENT DOCUMENTS

| | | | |
|---|---|---|---|
| 5,442,633 A | 8/1995 | Perkins et al. | |
| 5,530,963 A | 6/1996 | Moore et al. | |
| 5,625,877 A | 4/1997 | Dunn et al. | |
| 5,642,294 A | 6/1997 | Taniguchi et al. | |
| 5,659,685 A | 8/1997 | Williams et al. | |
| 5,710,560 A * | 1/1998 | Cohn | 340/982 |
| 5,745,190 A | 4/1998 | Ioka | |
| 5,751,378 A | 5/1998 | Chen et al. | |
| 5,774,593 A | 6/1998 | Zick et al. | |
| 5,801,765 A | 9/1998 | Gotoh et al. | |
| 5,835,163 A | 11/1998 | Liou et al. | |
| 5,884,056 A | 3/1999 | Steele | |
| 5,900,919 A | 5/1999 | Chen et al. | |
| 5,911,008 A | 6/1999 | Niikura et al. | |
| 5,920,360 A | 7/1999 | Coleman, Jr. | |
| 5,952,993 A * | 9/1999 | Matsuda et al. | 345/474 |
| 5,959,697 A | 9/1999 | Coleman, Jr. | |
| 5,983,273 A | 11/1999 | White et al. | |
| 5,990,980 A | 11/1999 | Golin | |
| 5,995,095 A | 11/1999 | Ratakonda | |
| 6,047,085 A | 4/2000 | Sato et al. | |
| 6,100,941 A | 8/2000 | Dimitrova et al. | |
| 6,166,735 A | 12/2000 | Dom et al. | |
| 6,462,754 B1 | 10/2002 | Chakraborty et al. | |
| 6,466,702 B1 | 10/2002 | Atkins et al. | |
| 6,643,665 B1 | 11/2003 | Kimbell et al. | |
| 6,658,059 B1 * | 12/2003 | Iu et al. | 375/240.16 |

(Continued)

FOREIGN PATENT DOCUMENTS

EP    0597450    5/1994

(Continued)

OTHER PUBLICATIONS

Fan, et al., "Visual Attention Based Image Browsing on Mobile Devices" 4 pages.

(Continued)

*Primary Examiner*—Gims Philippe
(74) *Attorney, Agent, or Firm*—Lee & Hayes, PLLC

(57) ABSTRACT

Systems and methods to generate a motion attention model of a video data sequence are described. In one aspect, a motion saliency map B is generated to precisely indicate motion attention areas for each frame in the video data sequence. The motion saliency maps are each based on intensity I, spatial coherence Cs, and temporal coherence Ct values. These values are extracted from each block or pixel in motion fields that are extracted from the video data sequence. Brightness values of detected motion attention areas in each frame are accumulated to generate, with respect to time, the motion attention model.

27 Claims, 4 Drawing Sheets

U.S. PATENT DOCUMENTS

| | | | |
|---|---|---|---|
| 6,670,963 B1 * | 12/2003 | Osberger | 345/629 |
| 6,714,909 B1 | 3/2004 | Gibbon et al. | |
| 6,870,956 B1 * | 3/2005 | Qi et al. | 382/170 |
| 2002/0157116 A1 | 10/2002 | Jasinschi | |
| 2002/0166123 A1 | 11/2002 | Schrader et al. | |
| 2003/0033347 A1 | 2/2003 | Bolle et al. | |
| 2003/0152363 A1 | 8/2003 | Jeannin et al. | |
| 2003/0237053 A1 | 12/2003 | Chen et al. | |
| 2004/0040041 A1 | 2/2004 | Crawford | |
| 2004/0078357 A1 | 4/2004 | LaChapelle et al. | |
| 2004/0078382 A1 | 4/2004 | Mercer et al. | |
| 2004/0078383 A1 | 4/2004 | Mercer et al. | |

FOREIGN PATENT DOCUMENTS

| | | |
|---|---|---|
| EP | 1 168 840 A2 | 1/2002 |
| EP | 1 213 915 A2 | 6/2002 |
| GB | 2 356 080 A | 5/2001 |

OTHER PUBLICATIONS

Ahmad Subutai; "VISIT: A Neural Model of Covert Visual Attention" Advances in Neural Information Processing Systems, v. 4, 1991, pp. 420-427.

Baluja et al.; "Expectation-Based Selective Attention for Visual Monitoring and Control of a Robot Vehicle" Robotics and Autonomous Systems, v. 22 No. 3-4, Dec. 1997, pp. 329-344.

Chen et al.; "A Visual Attention Model for Adapting Images on Small Displays" ACM Multimedia Systems Journal, 2003.

Cherry Steven M.; "Pesky Home Networks Trouble cable Behemoths" IEEE Spectrum, Apr. 2002, pp. 60-61.

Deng et al.;"Peer Group Filtering and Perceptual Color Image Quantization" Proceedings of IEEE International Symposium on Circuits and Systems, vol. 4, 1999, pp. 21-24.

Gamaz et al.; "Robust scene-change detection in MPEG compressed domain" Electrical & Computer Engineering, 1998, pp. 95-99.

Gu et al.; "Dissolve Detection in MPEG Compressed Video" IEEE, 1997, pp. 1692-1696.

Hargrove, Thomas; "Logo Detection in Digital Video" Math 100, Mar. 6, 2001 http://toonarchive.com/logo-detection/, 9 pages.

Held, Gibert; "Focus on Agere System's Orinoco PC Card" International Journal of Network Management, Jan. 2002, pp. 187-193.
http://www.fatalfx.com/nomad/ "NOMAD (No More Advertising)" Feb. 17, 2003, 4 pages.

U.S. Appl. No. 10/371,125 filed Feb. 20, 2003; Inventors: Wei-Ying Ma et al., Entitled "Systems and Methods for Enhanced Image Adaptation".

Heng et al.; "Post Shot Boundary Detection Technique: Flashlight Scene Determination" University of Western Australia, 1999, pp. 447-450.

Jha, Uma S.; "Wireless Landscape-Need for Seamless Connectivity" Wireless Personal Communications 2002 pp. 275-283.

Jing et al.; "An Effective Region-Based Image Retrieval Framework" From ACM Multimedia, 2002, 28 pages.

Lelescu et al.; "Real-time Scene Change Detection on Compressed Multimedia Bitstream Based on Statistical Sequential Analysis" IEEE, 2000, pp. 1141-1144.

Li et al.; "Statistical Learning of Multi-View Face Detection" Proceedings of ECCV, 2002, 25 pages.

Lienhart, R. et al.; "On the Detection and Recognition of Television Commercials" University of Mannheim, 17 pages.

Lu, Lie et al.; "A Robust Audio Classification and Segmentation Method" Microsoft Research, China, 9 pages.

Lu, Lie et al.; "Content Analysis for Audio Classification and Segmentation" IEEE Transactions on Speech and Audio Processing, vol. 10 No. 7, Oct. 2002, pp. 504-516.

Lu, Lie et al.; "Content-Based Audio Segmentation Using Support Vector Machines" IEEE, 2001, pp. 956-959.

Ma et al.; "A User Attention Model for Video Summarization" Proceedings of ICIP, 2002.

Milanese R. et al.; "Attentive Mechanisms for Dynamic and Static Scene Analysis" Optical Engineering, v34 No. 8, Aug. 1995, pp. 2428-2434.

Niebur, E. et al.; "Computational Architectures for Attention" The Attentive Brain, Chapter 9, 1998, pp. 163-186.

O'Toole; "An MPEG-1 Shot Boundary Detector Using XIL Colour Histograms" Dublin City University, 1998, pp. 1-7.

Sadlier, David A.; "Automatic TV Advertisement Detection from MPEG Bitstream" Centre for Digital Video Processing/Research Institute for Network & Communication Eng., Dublin City University, 12 pages.

Sahoo P.K. et al.; "Threshold Selection Using a Minimal Histogram Entropy Difference" Optical Engineering, v36 No. 7, Jul. 1997, pp. 1976-1981.

Sanchez, Juan Maria; "AudiCom: A Video Analysis System for Auditing Commercial Broadcasts" Computer Vision Center Department d'Informatica Universitat Autonoma de Barcelona, 5 pages.

Tsotsos J. K. et al.; "Modeling Visual Attention Via Selective Tuning" Artificial Intelligence v78 1995 pp. 507-545.

Wolfe J. M. et al.; "Deploying Visual Attention: The Guided Search Model" AI and the Eye, Chapter 4, 1990, pp. 79-103.

Yeo et al.; "Rapid Scene Analysis on Compressed Video" IEEE, 1995, pp. 533-544.

Yusoff et al.; "Video Shot Cut Detection Using Adaptive Thresholding" University of Surrey, 2000, pp. 1-10.

Zabih, Ramin; "A Feature-Based Algorithm for Detecting and Classifying Scene Breaks" Computer Science Department, Cornell University, 16 pages.

Zadeh L. A.; "Probability Measures of Fuzzy Events" Journal of Mathematical Analysis and Applications, 23, 1968, pp. 421-427.

Divakaran, A., Radhakrishnan, R., Peker, K. A.; "Video Summarization using Descriptors of Motion Activity: A Motion Activity Based Approach to Key-Frame Extraction from Video Shots" Journal of Electronic Imagin, SPIE + IS&T vol. 10, No. 4, Oct. 2001 pp. 909-916.

U.S. Appl. No. 10/286,053, filed Nov. 1, 2002, inventors Yu-Fei Ma et al., entitled "Systems and Methods for Generating a Comprehensive User Attention Model,".

Lee, Keansub et al., "Perception-Based Image Transcoding for Universal Multimedia Access," School of Electical Engineering Korea University, Seoul, Korea, 2001 IEEE, pp. 475-478.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Int. WWW Conf. pp. 1-21.

U.S. Appl. No. 10/179,161, filed Jun. 24, 2002, inventors Jin-Lin Chen & Wei-Ying Ma, entitled "Function-based Object Model for Web Page Display in a Mobile Device,".

U.S. Appl. No. 10/286,348, filed Nov. 1, 2002, inventors Xian-Sheng Hua et al., entitled "Systems and Methods for Automatically Editing a Video,".

M.A. Smith & T. Kanade, "Video Skimming an Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, pp. 473-482, Jan. 1999.

Yu-Fei Ma & Hong-Jiang Zhang, "A New Perceived Motion Based Shot Content Representation," Microsoft Research China, 4 pages.

Yu-Fei Ma & Hong-Jiang Zhang, "A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

Zhang et al., "A Hierarchical Organization Scheme for Video Data" Pattern Recognition, Elsevier, Kidlington, GB, vol. 35 No. 11, Nov. 2002, pp. 2381-2387.

"Advanced Digital Video Storage and On-line Retrieval System", Advisor Project, Jun. 30, 2002, retrieved from the Internet: http://advisor.matrasl-tls.fr/DUP_workshop_sheet.pdf.

Bertini et al., "Indexing for Resue of TV News Shots" Pattern Recognition, Elsevier, Kidlington, GB, vol. 35, No. 3, Mar. 2002, pp. 581-591.

Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.

* cited by examiner

SYSTEMS AND METHODS FOR GENERATING A MOTION ATTENTION MODEL

RELATED APPLICATIONS

This patent application is related to:

U.S. patent application Ser. No. 10/286,053, titled "Systems and Methods for Generating a Comprehensive User Attention Model", filed on Nov. 01, 2002, commonly assigned herewith, and which is hereby incorporated by reference.

U.S. patent application Ser. No. 10/286,527, titled "Systems and Methods for Generating a Video Summary", filed on Nov. 01, 2002, commonly assigned herewith, and which is hereby incorporated by reference.

U.S. patent application Ser. No. 10/286,348, titled "Systems and Methods for Automatically Editing a Video", filed on Nov. 01, 2002, commonly assigned herewith, and which is hereby incorporated by reference.

TECHNICAL FIELD

The invention relates to video data analysis. In particular, the invention pertains to identifying elements of video data that are most likely to attract the attention of an observer/listener.

BACKGROUND

One of the key issues in video manipulation is video abstraction in the form of skimmed video. For this purpose, an important task is to determine the content significance of each chunk of frames in a video sequence. Content significance is related to those portions of the video sequence that are likely to attract the attention of observers. To this end, motion attention models to assist in determining content significance of video sequence portions are greatly desired. The following systems and methods are directed to addressing this need for useful motion attention to determine which elements of a video data sequence are likely to attract human attention.

SUMMARY

Systems and methods to generate a motion attention model of a video data sequence are described. In one aspect, a motion saliency map B is generated to precisely indicate motion attention areas for each frame in the video data sequence. The motion saliency maps are each based on intensity I, spatial coherence Cs, and temporal coherence Ct values. These values are extracted from each block or pixel in motion fields that are extracted from the video data sequence. For purposes of this discussion, the term "block" represents one or more picture elements or pixels. Brightness values of detected motion attention areas are accumulated to generate motion attention value for each frame. With respect to time, a motion attention curve is obtained. This process is called motion attention modeling.

BRIEF DESCRIPTION OF THE DRAWINGS

The detailed description is described with reference to the accompanying figures.

DETAILED DESCRIPTION

Overview

Figure 1:
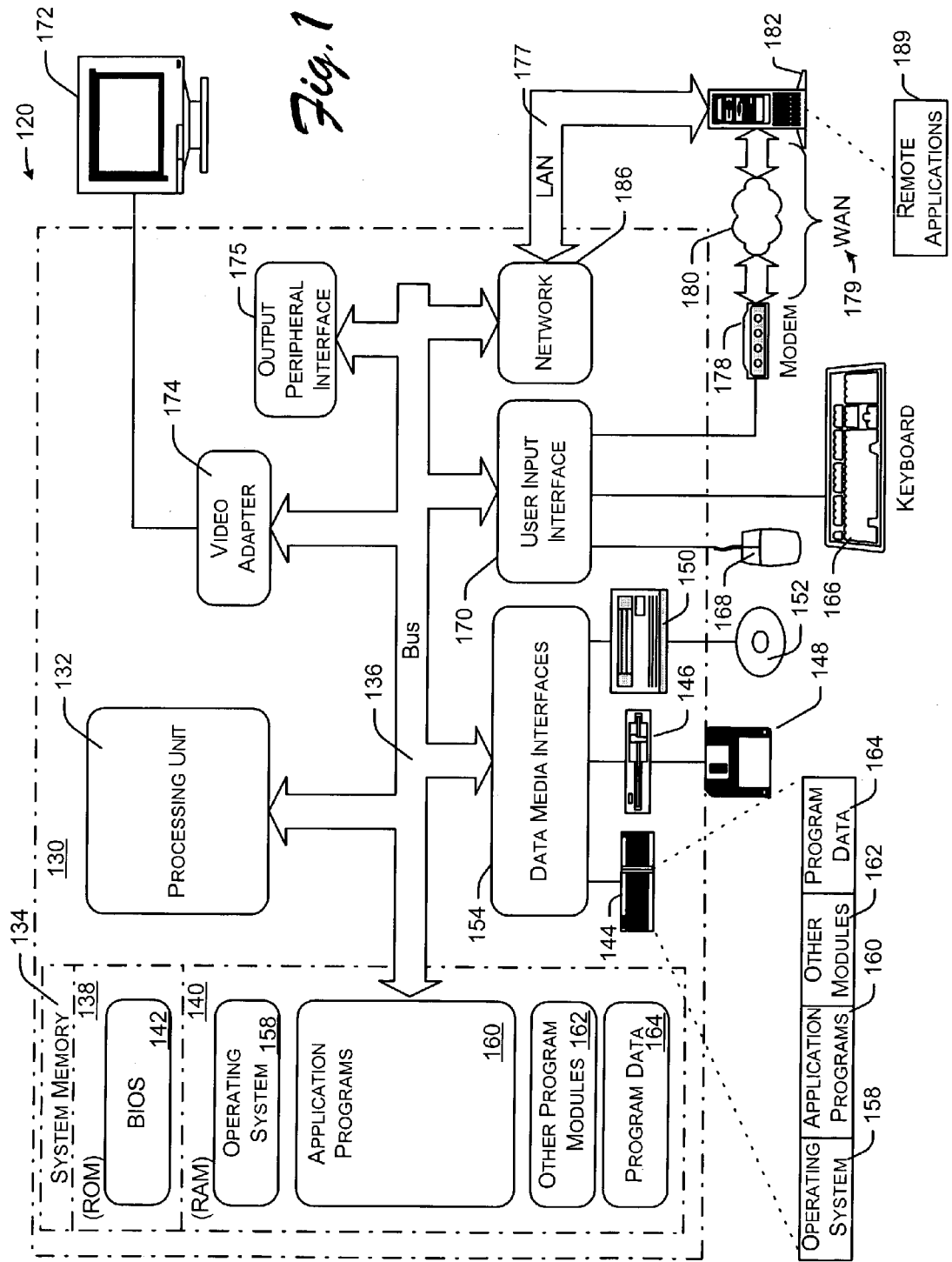
FIG. 1 is a block diagram showing an exemplary computing environment to generate a motion attention model for attention analysis of a video data sequence.
Figure 2:
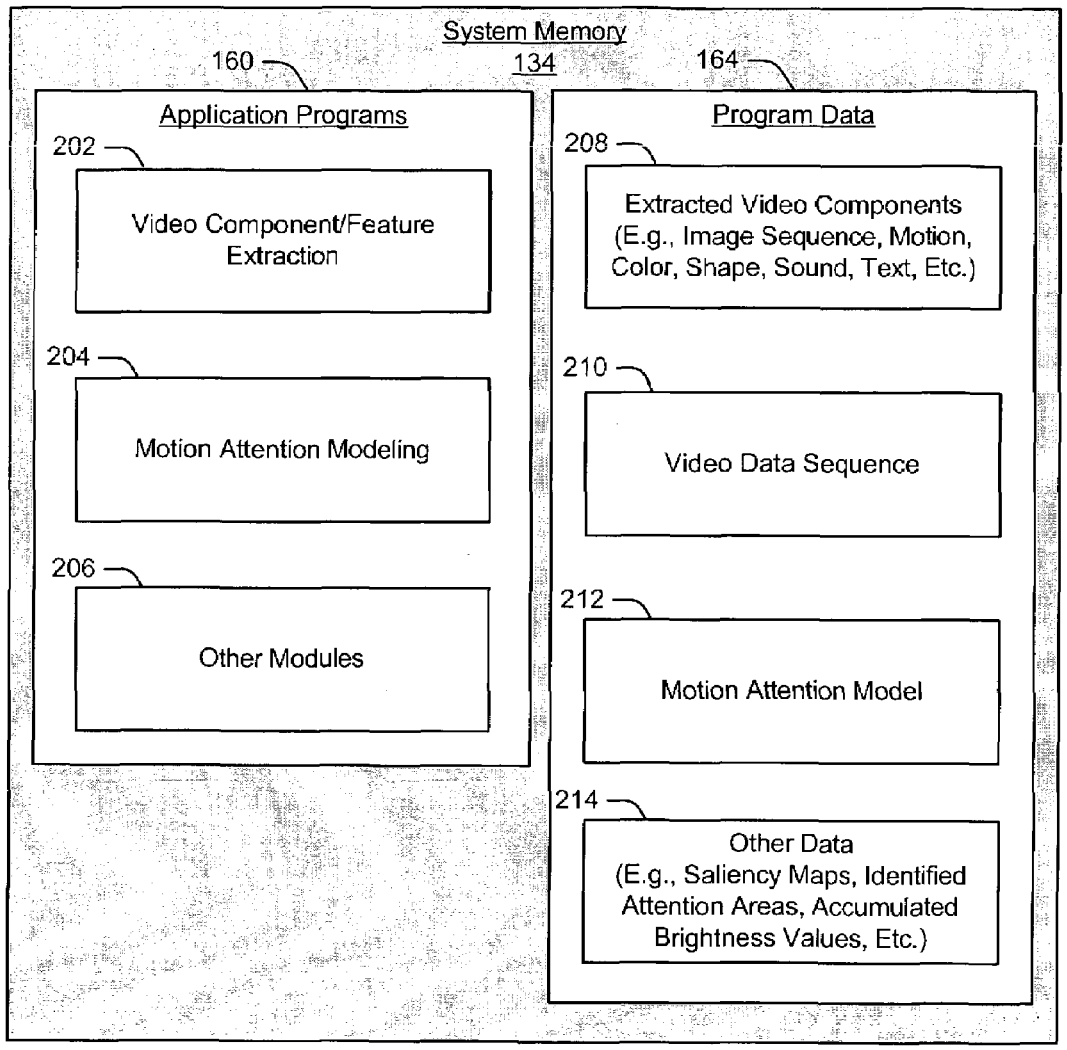
FIG. 2 shows an exemplary computer-program module framework to generate a motion attention model for attention analysis of a video data sequence.

The following systems and methods are directed to generating a motion attention model for computational analysis of a video data sequence. As a basic concept, "attention" is considered to be a neurobiological concentration of mental powers upon an object; a close or careful observing or listening, which is the ability or power to concentrate mentally. The following sections introduce an exemplary operating environment for generating a motion attention model for attention analysis of a video data sequence. The exemplary operating environment is described in conjunction with exemplary methodologies implemented in a framework of computer-program modules and data flows between the program modules. The motion attention model generated via this framework can be used to enable and enhance many video data applications that depend on determining which elements of a video data sequence are more likely than others to attract human attention.

An Exemplary Operating Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Program modules generally include routines, programs, objects, components, data structures, etc., that perform particular tasks or implement particular abstract data types.

FIG. 1 is a block diagram showing an exemplary computing environment 120 on which the described systems, apparatuses and methods may be implemented. Exemplary computing environment 120 is only one example of a suitable computing environment and is not intended to suggest any limitation as to the scope of use or functionality of systems and methods described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, including hand-held devices, multi-processor systems, microprocessor based or programmable consumer electronics, network PCs, minicomputers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164. The systems and methods described herein to generate a motion attention model for analyzing attention in a video data sequence may be implemented within operating system 158, one or more application programs 160, other program modules 162, and/or program data 164. A number of exemplary application programs and program data are described in greater detail below in reference to FIG. 9.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130. Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

FIG. 9 is a block diagram that shows further exemplary aspects of application programs 160 and program data 164 of the exemplary computing device 130 of FIG. 1. In particular, system memory 134 includes, for example, video component/feature extraction module 202, motion attention modeling module 204, and other modules 206 such as an operating system to provide a run-time environment, device drivers, and so on. The video component extraction module extracts video components 208 from input video data sequence 210. The extracted video components are used to generate motion attention model 212. The extracted video components include, for example, image sequence. From image sequence, motion (object motion and camera motion), color, shape, texture, and/or text region(s) features are determined. Motion attention modeling module 204 applies motion attention modeling techniques that are described immediately below, to the extracted video features 208 to generate motion attention model 212.

Motion Attention Modeling

Motion attention modeling module 204 generates motion attention model 212 based on motion fields extracted from video data sequence 210. Motion fields or descriptors include, for example, motion vector fields (MVFs), optical flow fields, and so on. For a given frame in a video sequence, the motion field between the current and the next frame is extracted to calculate a set of motion characteristics. In this implementation, video sequences, which include audio channels, are stored in a compressed data format such as the MPEG data format. MVFs are readily extracted from MPEG data. The motion attention model of this implementation uses MVFs, although any other motion field or descriptor may also be used to implement the described motion attention model.

If a MVF is considered to be analogous to a retina in an eye, the motion vectors represent a perceptual response of optic nerves. It is assumed that each block or pixel in MVF has three inductors: an Intensity Inductor, a Spatial Coherence Inductor, and a Temporal Coherence Inductor. When the motion vectors in the MVF go through such inductors, they will be transformed into three corresponding maps. These normalized outputs of inductors are fused into a saliency map by linear combination, as discussed below in reference to equation (6). In this way, the attended regions (regions on which a human will focus/pay attention) can be detected from saliency map image by image processing methods.

Three inductors are calculated at each location of block $MB_{i,j}$. The Intensity Inductor induces motion energy or activity, called motion intensity I, and is computed, namely, as the normalized magnitude of motion vector, $$I(i, j) = \sqrt{dx_{i,j}^2 + dy_{i,j}^2} / \text{MaxMag} \qquad (1)$$

where $(dx_{i,j}, dy_{i,j})$ denote two components of motion vector, and MaxMag is the maximum magnitude in a MVF.

The Spatial Coherence Inductor induces the spatial phase consistency of motion vectors. Regions with consistent motion vectors have high probability to be in one moving object. In contrast, regions with inconsistent motion vectors are more likely located at the boundary of objects or in still background. Spatial coherency is measured using a similar method as described in "A New Perceived Motion based Shot Content Representation", by Y. F. Ma and H. J. Zhang, published in 9001, and hereby incorporated by reference. First a phase histogram is computed in a spatial window with the size of w×w (pixels) at each location of a block. Then, the phase distribution is measured by entropy as follows:

$$Cs(i, j) = -\sum_{t=1}^{n} p_s(t)\text{Log}(p_s(t)) \qquad (2)$$

$$p_s(t) = SH_{i,j}^w(t) / \sum_{k=1}^{n} SH_{i,j}^w(k) \qquad (3)$$

where $SH^w_{i,j}(t)$ is the spatial phase histogram whose probability distribution function is $p_s(t)$, and n is the number of histogram bins.

Similar to spatial coherence inductor, temporal coherency is defined as the output of Temporal Coherence Inductor, in a sliding window of size L (frames) along time axis, as:

$$Ct(i, j) = -\sum_{t=1}^{n} p_t(t)\text{Log}(p_t(t)) \qquad (4)$$

$$p_t(t) = TH_{i,j}^L(t) / \sum_{k=1}^{n} TH_{i,j}^L(k) \qquad (5)$$

where $TH^L_{i,j}(t)$ is the temporal phase histogram whose probability distribution function is $p_t(t)$, and n is the number of histogram bins.

In this way, motion information from three channels I, Cs, Ct is obtained. In combination this motion information composes a motion perception system. Since the outputs from the three inductors, I, Cs, and Ct, characterize the dynamic spatio-temporal attributes of motion in a particular way, motion attention is defined as:

$$B = I \times Ct \times (1 - I \times Cs) \qquad (6)$$

By (6), the outputs from I, Cs, and Ct channels are integrated into a motion saliency map in which the motion attention areas can be identified precisely.

Figures 3, 4, 5, 6, 7:
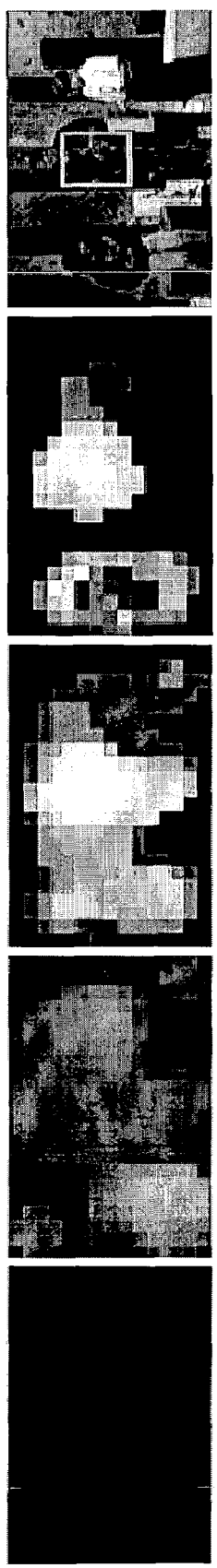
FIG. 3 represents a map of motion attention detection with an intensity inductor or I-Map.
FIG. 4 represents a map of motion attention detection with a spatial coherence inductor or Cs-Map.
FIG. 5 represents a map of motion attention detection with a temporal coherence inductor or Ct-Map.
FIG. 6 represents a map of motion attention detection with a saliency map.
FIG. 7 represents a video still or image, wherein a motion attention area is marked by a rectangular box.

FIGS. 3–6 represent exemplary maps of motion attention detection with respect to areas of motion in an original exemplary image of FIG. 7. In particular: FIG. 3 represents a map of motion attention detection with an I-Map; FIG. 4 represents a map of motion attention detection with a Cs-Map; FIG. 5 represents a map of motion attention detection with a Ct-Map; FIG. 6 represents a map of motion attention detection with a saliency map; and FIG. 7 represents the original image in which a motion attention area is marked by a rectangular box. Note that the saliency map of FIG. 6 precisely detects the areas of motion with respect to the original image of FIG. 7.

To detect salient motion attention regions as illustrated by the exemplary saliency map of FIG. 6, the following image processing procedures are employed: (a) histogram balance; (b) median filtering; (c) binarization; (d) region growing; and (e) region selection. With the results of motion attention detection, the motion attention model is calculated by accumulating the brightness of the detected motion attention regions in saliency map as follows:

$$M_{motion} = \left(\sum_{r \in \Lambda} \sum_{q \in \Omega_r} B_q\right) / N_{MB} \qquad (7)$$

where $B_q$ is the brightness of a block in saliency map, $\Lambda$ is the set of detected areas with motion attention, $\Omega_r$ denotes the set of blocks in each attention area, and $N_{MB}$ is the number of blocks in a MVF which is used for the normalization purpose. The $M_{motion}$ value of each frame in a video sequence then forms a continuous motion attention curve along the time axis.

A Procedure to Generate a Motion Attention Model

Figure 8:
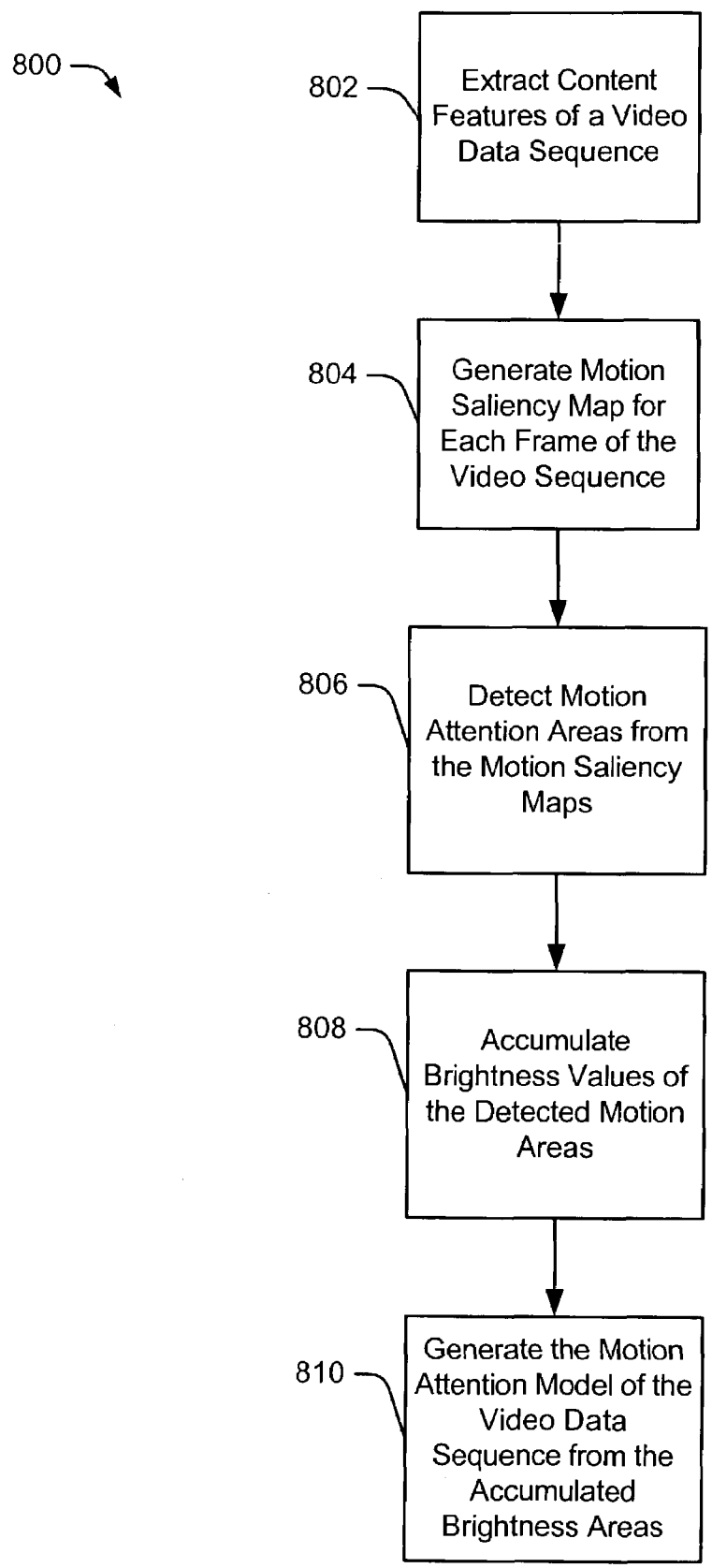
FIG. 8 is a flow diagram showing an exemplary procedure to generate a motion attention model for attention analysis of a video data sequence.

FIG. 8 is a flow diagram showing an exemplary procedure 800 to generate a motion attention model 212 of FIG. 9 for computational attention analysis of a video data sequence 210 (FIG. 9). For purposes of discussion, the operations of FIG. 8 are discussed while referring to elements of FIG. 9. At block 802, visual, audio, and linguistic features such as image sequence, motion, color, shape, sound, text, and so on, are extracted from a video data sequence. For example, video component extraction module 202 of FIG. 9 extracts video features as extracted video components 208. At block 804, motion saliency maps are generated for each extracted frame of the video data sequence. For example, motion attention modeling module 204 (FIG. 9) generates saliency maps (e.g., "other data" 214). An example of such a saliency map is shown in FIG. 6.

At block 806, motion attention areas are identified based on the generated motion saliency maps. For example, motion attention modeling module 204 (FIG. 9) identifies attention areas (e.g., "other data" 214). FIG. 7 represents a video still or image, wherein a motion attention area is marked by a rectangular box. At block 808, the motion attention modeling module accumulates brightness values from the identified motion attention areas. Equation (7), shown above, illustrates an exemplary algorithm for accumulating the brightness of the detected motion attention regions in a saliency map. At block 810, the accumulated brightness values are combined to form a continuous motion attention curve, or motion attention model 212 (FIG. 9) for the input video data sequence. The motion attention model is generated with respect to time.

Conclusion

The described systems and methods generate a motion attention model for use in video data analysis. Although the systems and methods to generate a motion attention model for video data analysis have been described in language specific to structural features and methodological operations, the subject matter as defined in the appended claims are not necessarily limited to the specific features or operations described. Rather, the specific features and operations are disclosed as exemplary forms of implementing the claimed subject matter.

What is claimed is:

1. A method for generating a motion attention model of a video data sequence, the method comprising:

generating a motion saliency map B to precisely indicate motion attention areas for each frame in the video data sequence, the motion saliency map being based on intensity I, spatial coherence $C_s$, and temporal coherence $C_t$ values from each location of a block $MB_{ij}$ in motion fields extracted from the video data sequence;

accumulating brightness of detected motion attention areas to generate, with respect to time, a motion attention model for the video data sequence; and wherein I is a normalized magnitude of a motion vector that is calculated according to:

$$I(i, j) = \sqrt{dx_{i,j}^2 + dy_{i,j}^2} / \text{MaxMag},$$

wherein $(dx_{i,j}, dy_{i,j})$ denotes two components of the motion vector in motion field, and MaxMag is the maximum magnitude of motion vectors.

2. A method for generating a motion attention model of a video data sequence, the method comprising:

generating a motion saliency map B to precisely indicate motion attention areas for each frame in the video data sequence, the motion saliency map being based on intensity I, spatial coherence $C_s$, and temporal coherence $C_t$ values from each location of a block $MB_{ij}$ in motion fields extracted from the video data sequence;

accumulating brightness of detected motion attention areas to generate, with respect to time, a motion attention model for the video data sequence; and wherein $C_s$ is calculated with respect to spatial widow w as follows:

$$Cs(i, j) = -\sum_{t=1}^{n} p_s(t) \text{Log}(p_s(t)),$$

$$p_s(t) = SH_{i,j}^w(t) / \sum_{k=1}^{n} SH_{i,j}^w(k); \text{ and}$$

wherein $SH^w_{i,j}(t)$ is a spatial phase histogram whose probability distribution function is $p_s(t)$, and n is a number of histogram bins.

3. A method for generating a motion attention model of a video data sequence, the method comprising:

generating a motion saliency map B to precisely indicate motion attention areas for each frame in the video data sequence, the motion saliency map being based on intensity I, spatial coherence $C_s$, and temporal coherence $C_t$ values from each location of a block $MB_{ij}$ in motion fields extracted from the video data sequence;

accumulating brightness of detected motion attention areas to generate, with respect to time, a motion attention model for the video data sequence; and wherein $C_t$ is calculated with respect to a sliding window of size L frames along time t axis as:

$$Ct(i, j) = -\sum_{t=1}^{n} p_t(t) \text{Log}(p_t(t)),$$

$$p_t(t) = TH_{i,j}^L(t) / \sum_{k=1}^{n} TH_{i,j}^L(k); \text{ and}$$

wherein $TH^L_{i,j}(t)$ is a temporal phase histogram whose probability distribution function is $p_t(t)$, and n is a number of histogram bins.

4. A method for generating a motion attention model of a video data sequence, the method comprising:

generating a motion saliency map B to precisely indicate motion attention areas for each frame in the video data sequence, the motion saliency map being based on intensity I, spatial coherence $C_s$, and temporal coherence $C_t$ values from each location of a block $MB_{ij}$ in motion fields extracted from the video data sequence;

accumulating brightness of detected motion attention areas to generate, with respect to time, a motion attention model for the video data sequence; and wherein the method further comprises instructions for generating the motion saliency map B according to $$B = I \times C_t \times (1/ \times C_s).$$

5. The method of claim 1, wherein the video data sequence is in an MPEG data format.

6. The method of claim 1 wherein the motion field is a motion vector field, or an optical flow field.

7. The method of claim 1, wherein the motion attention model is calculated according to:

$$M_{motion} = \left( \sum_{r \in \Lambda} \sum_{q \in \Omega_r} B_q \right) / N_{MB},$$

$B_q$ being brightness of a block in the motion saliency map, Λ being the set of detected motion attention areas, $Ω_r$ denoting a set of blocks in each detected motion attention area, $N_{MB}$ being a number of blocks in a motion field; and wherein an $M_{motion}$ value for each frame in the video data sequence represents a continuous motion attention curve with respect to time.

8. A computer-readable medium for generating a motion attention model of a video data sequence, the computer-readable medium comprising computer-program instructions executable by a processor for:

generating a motion saliency map B to precisely indicate motion attention areas for each frame in the video data sequence, the motion saliency map being based on intensity I, spatial coherence $C_s$, and temporal coherence $C_t$ values from each location of a block $MB_{ij}$ in motion fields extracted from the video data sequence; and accumulating brightness of detected motion attention areas to generate, with respect to time, a motion attention model for the video data sequence.

9. A computer-readable medium for generating a motion attention model of a video data sequence, the computer-readable medium comprising computer-program instructions executable by a processor for:

extracting a motion field between a current frame and a next frame of the video data sequence;

determining, at each location of a block $MB_{ij}$, intensity I, spatial coherence $C_s$, and temporal coherence $C_t$ values from the motion field;

integrating intensity I, spatial coherence $C_s$, and temporal coherence $C_t$ to generate a motion saliency map B, the motion saliency map precisely indicating motion attention areas in the motion field; and accumulating brightness of detected motion attention areas to indicate a motion attention degree for the current frame.

10. The computer-readable medium of claim 9, wherein the video data sequence is in an MPEG data format.

11. The computer-readable medium of claim 10, wherein the motion vector field is a motion vector field in MPEG stream, an optical flow field, or the result of block-based motion estimation.

12. The computer-readable medium of claim 9, wherein the computer-program instructions for determining intensity I further comprise instructions for generating intensity I as a normalized magnitude of the motion vector according to:

$$I(i, j) = \sqrt{dx_{i,j}^2 + dy_{i,j}^2} / \text{MaxMag},$$

wherein $(dx_{i,j}, dy_{i,j})$ denotes two components of the motion vector, and MaxMag is the maximum magnitude of motion vector.

13. The computer-readable medium of claim 9, wherein the computer-program instructions for determining spatial coherence $C_s$ further comprise instructions for:

generating a phase histogram in a spatial window with the size of w×w (pixels) at each location of the block;

measuring phase distribution is measured by entropy as follows:

$$Ct(i, j) = -\sum_{t=1}^{n} p_t(t)\text{Log}(p_t(t)),$$

$$p_t(t) = TH_{i,j}^L(t) / \sum_{k=1}^{n} TH_{i,j}^L(k); \text{ and}$$

wherein $SH^w_{i,j}(t)$ is a spatial phase histogram whose probability distribution function is $p_s(t)$, and ii is a number of histogram bins.

14. The computer-readable medium of claim 9, wherein the computer-program instructions for determining further comprise instructions for generating temporal coherence $C_t$ further comprise instructions for:

generating temporal coherence $C_t$ with respect to a sliding window of size L frames along time t axis, as:

$$Ct(i, j) = -\sum_{t=1}^{n} p_t(t)\text{Log}(p_t(t)),$$

$$p_t(t) = TH_{i,j}^L(t) / \sum_{k=1}^{n} TH_{i,j}^L(k); \text{ and}$$

wherein $TH^L_{i,j}(t)$ is a temporal phase histogram whose probability distribution function is $p_t(t)$, and n is a number of histogram bins.

15. The computer-readable medium of claim 9, wherein the computer-program instructions for integrating further comprises instructions for generating the motion saliency map B according to $B=I \times C_t \times (1-I \times C_s)$.

16. The computer-readable medium of claim 9, wherein the computer-program instructions for accumulating brightness further comprise instructions for detecting salient motion regions by employing histogram balance, median filtering, binarization, region growing, and/or region selection to the detected motion attention areas.

17. The computer-readable medium of claim 9, further comprising computer-program instructions for executing the extracting, determining, integrating, and accumulating for each frame in the video data sequence to generate a motion attention model for all frames in the video data sequence with respect to time.

18. The computer-readable medium of claim 17, wherein the motion attention model for all frames is calculated according to:

$$M_{motion} = \left(\sum_{r \in \Lambda}\sum_{q \in \Omega_r} B_q\right) / N_{MB},$$

$B_q$ being brightness of a block in the motion saliency map, Λ being the set of detected motion attention areas, $Ω_r$ denoting a set of blocks in each detected motion attention area, $N_{MB}$ being a number of blocks in a motion field; and wherein an $M_{motion}$ value for each frame in the video data sequence represents a continuous motion attention curve with respect to time.

19. A computing device for generating a motion attention model of a video data sequence that includes multiple frames, the computing device comprising:

a processor; and a memory coupled to the processor, the memory comprising computer-program instructions executable by the processor for,
for each frame in the video data sequence:
(a) extracting a motion field between a current frame and a next frame of the video data sequence;
(b) determining, for each block $MB_{ij}$ represented by the motion field, intensity I, spatial coherence $C_s$, and temporal coherence $C_t$ values to generate a motion saliency map B, the motion saliency map precisely indicating motion attention areas for each frame in the video data sequence; and
accumulating brightness of detected motion attention areas to generate the motion attention model with respect to time.

20. The computing device of claim 19, wherein the video data sequence is in an MPEG data format.

21. The computing device of claim 19, wherein the motion field is a motion vector field, or an optical flow field.

22. The computing device of claim 19, wherein the computer-program instructions for determining intensity I further comprise instructions for generating intensity I as a normalized magnitude of the motion vector according to:

$$I(i, j) = \sqrt{dx_{i,j}^2 + dy_{i,j}^2} / MaxMag,$$

wherein $(dx_{i,j}, dy_{i,j})$ denotes two components of the motion vector, and MaxMag is the maximum magnitude of motion vector.

23. The computing device of claim 19, wherein the computer-program instructions for determining spatial coherence $C_s$ further comprise instructions for:
generating a phase histogram in a spatial window with the size of w×w (pixels) at each location of the block;
measuring phase distribution is measured by entropy as follows:

$$Cs(i, j) = -\sum_{t=1}^{n} p_s(t) \text{Log}(p_s(t)),$$

$$p_s(t) = SH_{i,j}^w(t) / \sum_{k=1}^{n} SH_{i,j}^w(k); \text{ and}$$

wherein $SH^w_{i,j}(t)$ is a spatial phase histogram whose probability distribution function is $p_s(t)$, and n is a number of histogram bins.

24. The computing device of claim 19, wherein the computer-program instructions for determining further comprise instructions for generating temporal coherence $C_t$ further comprise instructions for:
generating temporal coherence $C_t$ with respect to a sliding window of size L frames along time t axis, as:

$$Ct(i, j) = -\sum_{t=1}^{n} p_t(t) \text{Log}(p_t(t)),$$

$$p_t(t) = TH_{i,j}^L(t) / \sum_{k=1}^{n} TH_{i,j}^L(k); \text{ and}$$

wherein $TH^L_{i,j}(t)$ is a temporal phase histogram whose probability distribution function is $p_1(t)$, and n is a number of histogram bins.

25. The computing device of claim 19, wherein the computer-program instructions for integrating further comprises instructions for generating the motion saliency map B according to $B = I \times C_t \times (1 - I \times C_s)$.

26. The computing device of claim 19, wherein the computer-program instructions for accumulating brightness further comprise instructions for detecting salient motion regions by employing histogram balance, median filtering, binarization, region growing, and/or region selection to the detected motion attention areas.

27. The computing device of claim 19, wherein the motion attention model is calculated according to:

$$M_{motion} = \left( \sum_{r \in \Lambda} \sum_{q \in \Omega_r} B_q \right) / N_{MB},$$

$B_q$ being brightness of a block in the motion saliency map, $\Lambda$ being the set of detected motion attention areas, $\Omega_r$ denoting a set of blocks in each detected motion attention area, $N_{MB}$ being a number of blocks in a motion field; and
wherein an $M_{motion}$ value for each frame in the video data sequence represents a continuous motion attention curve with respect to time.

* * * * *